United States Patent Office 2,911,540
Patented Nov. 3, 1959

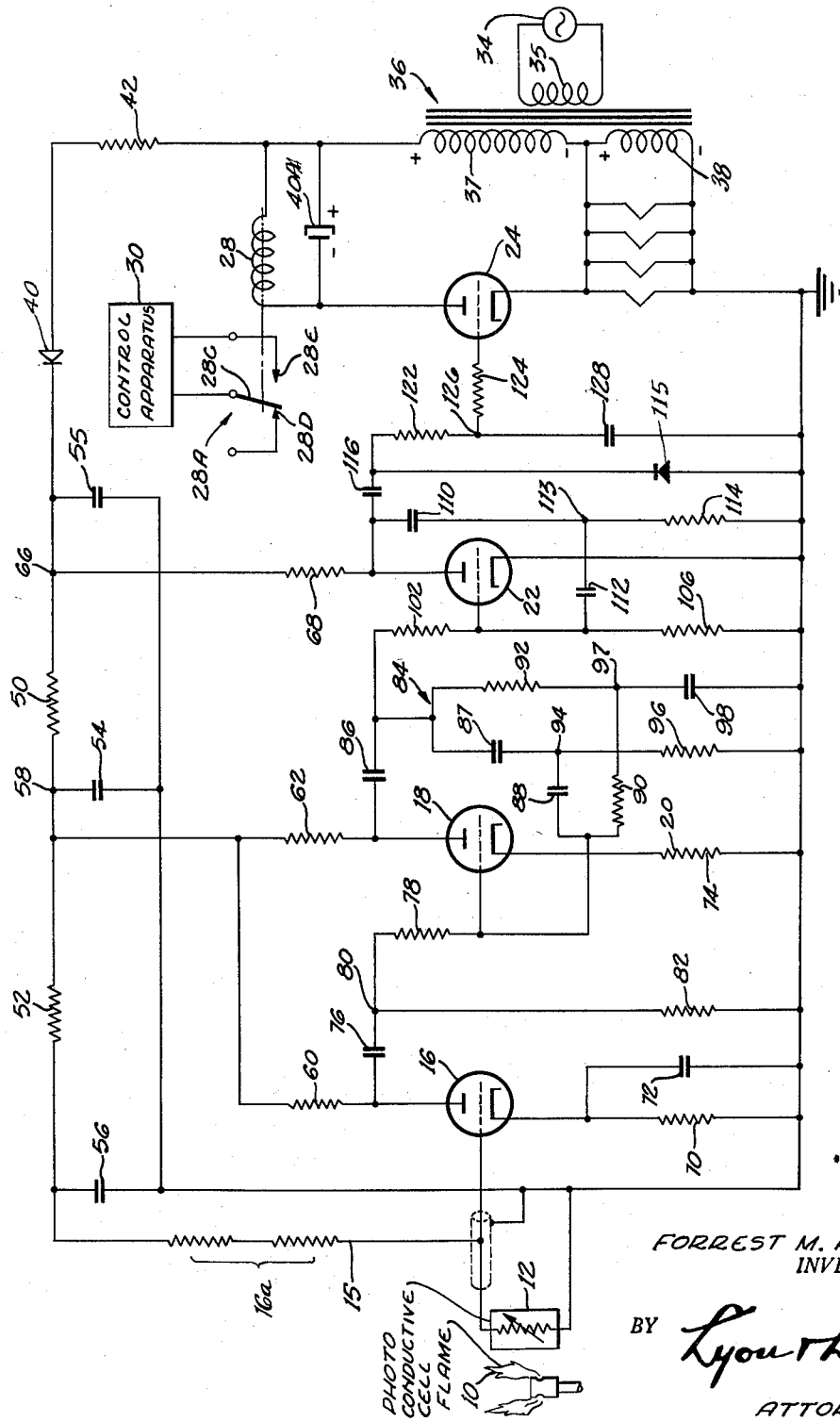

2,911,540

FLAME DETECTION SYSTEM

Forrest M. Powers, Burbank, Calif., assignor to General Controls Co., Glendale, Calif., a corporation of California Application February 14, 1955, Serial No. 487,853

7 Claims. (Cl. 250—217)

The present invention relates to improved means and techniques for detecting the presence of a flame, although it is appreciated that certain aspects of the present invention may find utility in other types of systems.

In general, the arrangement described herein includes a photoconductive cell of for example the cadmium sulfide type which is sensitive to radiation from a flame. This cell is connected through a high resistance to a direct current voltage source in such a manner that when and as the intensity of the radiation increases, the voltage across the cell decreases. This voltage which is thus developed across the cell may be considered to consist of two components, namely a first component which is a substantially continuous unidirectional voltage representative of the average light intensity of the radiation, i.e. the flame; and a second component which varies in accordance with sporadic fluctuations in the intensity of such flame. It is a well recognized fact that such fluctuations in intensity of the flame occur at a frequency of approximately 25 cycles per second. The voltage thus developed across the cell is applied to a unique amplifying system which is effectively tuned to such frequency of approximately 25 cycles per second so as to selectively amplify that component of the voltage which is representative of such sporadic fluctuations. A unique feature of such amplifying system is that it will function as indicated above without over-loading, despite the fact that the average light intensity which is productive of such unidirectional component may extend over a relatively large range of values. Thus, it was found that the percentage of fluctuation or flicker in all types of flames is fairly constant so that at any light level from a weak gas flame to an intense oil flame, the signal output of the amplifying means which is directly coupled to the photoconductive cell is essentially the same. Thus, it is considered that the amplifying means has what may be termed to be "automatic gain control" so as to be operable for the intended purposes when used either with a weak gas flame or an intense oil flame.

The output of the amplifying means is applied in a unique manner to a control tube so as to allow such control tube to be energized from an alternating current source. As a matter of fact, the entire flame detection system may be energized from an alternating current source and without the necessity of auxiliary batteries.

It is therefore a general object of the present invention to provide an improved flame detection system of the character indicated above.

A specific object of the present invention is to provide a flame detection system which incorporates the advantages of a photoconductive cell, of for example the cadmium sulfide type.

Another object of the present invention is to provide a specific system of this character in which a photoconductive cell is coupled in a unique manner to an associated amplifying system which is capable of selectively amplifying relatively small current or voltage variations in spite of the fact that such small variations may be present with a unidirectional component having a magnitude which may possibly lie within a relatively large range of magnitudes, depending upon the particular average intensity of the radiation impinging on such cell.

Another specific object of the present invention is to provide an improved system of this character in which a low frequency voltage variation is selectively amplified without the use of tuned circuits.

Another specific object of the present invention is to provide an improved system of this character which is powered from an alternating current voltage source and which functions to eliminate any erroneous results which may otherwise be due to the frequency of such alternating current voltage source or harmonics of such frequency.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

The single figure of the drawing illustrates in schematic form, apparatus in a flame detecting system embodying features of the present invention.

Referring to the drawing, radiation from the flame 10 impinges upon the photoconductive cell of the cadmium sulfide type 12 to cause it to change its resistance over wide ranges, typically 10,000 megohms to 1 megohm. This cell 12 is supplied with a direct current voltage appearing on the lead 15 through a high resistance 16A in such a manner that when and as the radiations from the flame 10 increases, the voltage drop across the cell 12 decreases. This voltage across the cell 12 is applied directly between the control grid and the cathode of the tube 16. The magnitude of this voltage applied to the grid of tube 16 may vary between 200 volts and 10 volts, depending upon the average intensity of the light or flame being viewed. In order that the tube 16 may properly function, the voltage on the cathode of the tube 16 is allowed to follow the voltage on the grid at a response rate of about one-quarter of one cycle per second. Thus, frequencies above this relatively small value have little effect upon the cathode potential. Since the frequency of the flame fluctuations or flicker is approximately 25 cycles per second, the cathode voltage does not follow the grid voltage and thus voltages of this frequency are allowed to be amplified and appear in amplified form on the anode of tube 16. It has been found that the percentage of flicker in all types of flames is fairly constant so that at any particular light level from a weak gas flame to an intense oil flame the signal output of tube 16, i.e. the voltage developed on the anode of tube 16, is essentially the same.

The output of tube 16 is coupled in a conventional manner to the control grid of the succeeding tube 18. It is noted, however, that the anode of tube 18 is coupled to the grid of such tube by a so-called bridged T filter 84. The function of this circuit is to feed back all unwanted signals from the anode to the control grid in an out of phase condition, thereby providing cancellation of the same, but at the same time the 25 cycle signal is fed back in phase to produce a regenerative effect at this particular frequency. To insure stability of this arrangement, some degeneration in the form of current feed back is introduced by the un-bypassed cathode resistance 20.

The anode of tube 18 is capacitively coupled to the control grid of the succeeding tube 22 which is essentially a conventional resistance-coupled amplifier with, however, a high pass R-C filter comprising condensers 110, 112 and resistance 114 connected between the anode of tube 22 and its control grid. This filter feeds back the unwanted high frequency in such a manner as to cancel the same. This particular circuit is quite effective in eliminating effects of any power frequency components or harmonics thereof. The 25 cycle signal thus developed on the anode of tube 22 is rectified by rectifier 115. The output of the rectifier circuit is a positive voltage which is applied to the control grid of the control tube 24 so as to cause the same to conduct when and only when the flame is present. When tube 24 thus conducts, the relay winding 28 is energiezd to thereby actuate the associated single pole double-throw relay switch 28A which has the movable contact 28C and the cooperating stationary contacts 28D and 28E. When winding 28 is thus energized, the switch arm 28C contacts the stationary contact 28E so as to allow control apparatus designated generally by the block 30 to be energized. Such control apparatus may be used for different purposes, one of which is to prevent the flow of fuel to that burner intended to produce the flame 10. Thus, when the flame 10 is not present, the flow of fuel to the burner is automatically interrupted for obvious safety purposes.

Now that the circuitry and its functioning is described generally above, a detailed description of the same now follows.

The system is powered from an alternating current voltage source 34 which is connected to the primary winding 35 of the transformer 36 having a first secondary winding 37 and a second secondary winding 38. The windings 37 and 38 are connected in a series aiding condition so that during one-half cycle these two secondary windings may be considered to have that polarity represented by the plus and minus signs adjacent the ends of such windings. In general, the winding 38 serves to supply an operating bias voltage for the control tube 24 as well as to provide a 12 volt output for heating the heaters of the tubes 16, 18, 22 and 24. It is noted that the junction point of the windings 37 and 38 is connected to the cathode of tube 24. The outside terminal of winding 38 is grounded while the outside terminal of the winding 37 is connected on the one hand to the anode of tube 24 through the relay winding 28 which is shunted by the condenser 40a, and such outside terminal on the other hand is connected to the positive terminal of the rectifier 40 through the small transient suppressing resistance 42 for purposes of supplying a unidirectional voltage to the cell 12, as well as to the anodes of tubes 16, 18 and 22.

One terminal of the rectifier 40 is connected to one terminal of the cell 12 through the series combination of resistances, namely the filter resistance 50, the filter resistance 52 and the voltage dropping resistance 16A, the other terminal of the cell 12 being grounded to provide a return current path. The filter resistance 50 is shunted by the series-connected filter condensers 54 and 55. Similarly, the filter resistance 52 is shunted by the series-connected condensers 54 and 56 for filtering purposes. The junction point 58 between resistances 50 and 52 is connected on the one hand to the anode of tube 16 through the load resistance 60 and is connected also on the other hand to the anode of tube 18 through the load resistance 62. The junction point 66 between resistance 50 and the rectifier 40 is connected to the anode of tube 22 through the load resistance 68.

The cathode of tube 16 is returned to ground through the shunt-connected resistance 70 and condenser 72 combination. The cathode of tube 18 is returned to ground through the un-bypassed resistance 74, and the cathode of tube 22 is returned to ground directly. The control grid of tube 16 is connected directly to the ungrounded terminal of the cell 12.

The resistance 70 has a magnitude of 1 megohm and the condenser 72 has a magnitude of .22 microfarad. Using these values for resistance 70 and condenser 72, a relatively high continuous voltage applied to the control grid of tube 16 will cause a relatively high continuous voltage to be developed on the cathode of tube 16. Thus, with respect to such continuous voltages, the potential developed on the cathode of tube 16 follows generally the voltage applied to the control grid of such tube. Because of the high resistance of resistance 70, the behavior of tube 16 for continuous voltages; i.e., for voltages of zero frequency and also for very low frequencies of, for example, one-quarter of one cycle per second, may be likened to the behavior of a cathode follower. However, because of the load resistance 60 and the bypass condenser 72, such is not the case for voltages having a cyclical variation of approximately 25 cycles per second, and, thus, voltage components of this particular frequency appear in amplified form on the anode of tube 16 which is coupled to the control grid of tube 18 through the condenser 76 and resistance 78, the junction point 80 of these two elements being returned to ground through the grid resistance 82.

The 25 cycle component, thus appearing on the grid of tube 18, is amplified by tube 18 and appears in amplified form on the anode of tube 18. For purposes of producing a selective effect with respect to voltages of approximately 25 cycles per second, a regenerative path 84, in the form of a bridged T filter, is interconnected between the anode and the control grid of tube 18. Specifically, such anode is connected to the control grid through the series combination of condensers which include the coupling condenser 86 and condensers 87 and 88. The series combination of condensers 87 and 88 is shunted by the series combination of resistances 90 and 92. The junction point 94 between condensers 87 and 88 is returned to ground through the resistance 96; and the junction point 97 between resistances 90 and 92 is returned to ground through the condenser 98. This particular regenerative path 84 serves to feed back all unwanted signals from the anode to the control grid of tube 18 in an out of phase condition to produce cancellation, while at the same time the same path serves to feed back the 25 cycle signal in phase so as to obtain a boost in the signal.

The voltage thus developed on the anode of tube 18 is impressed on the control grid of tube 22 through the series connected condener 86 and resistance 102, the control grid of tube 22 being returned to ground through resistance 106. A high pass filter is interconnected between the anode of tube 22 and its control grid and such filter includes as elements thereof the series connected condensers 110 and 112 and the resistance 114 which has one of its terminals grounded and the other one of its terminals connected to the junction point 113 between the condensers 110 and 112. This high pass R-C filter serves to feed back the unwanted high frequencies in such a manner as to cancel them. This circuit is quite effective in eliminating the effects of power frequency variations and harmonics thereof, namely 60 cycle frequency variations and harmonics thereof.

The output signal thus developed on the anode of tube 22 is applied through the condenser 116 to the rectifier 115 so that the same may be rectified thereby. The rectifier 115 is a selenium diode with high reverse resistance. The output of the rectifier circuit which includes the rectifier 115 is a positive voltage and such voltage is applied to the control grid of tube 24 through the series combination of resistances 122 and 124, having the junction point 126 connected to the ungrounded terminal of the condenser 128.

It is noted that the control of tube 24 involves more than just the application of a positive voltage to its grid. The application of such positive signal must be handled rather carefully and conditions must always be such that the tube 24 conducts only when the signal is present. This requires the generation and application of bias voltage to the control grid of tube 24 to assure non-conduction in the tube 24 when no signal is present, i.e. when the flame 10 is absent.

It is observed that when the polarity of the winding 38 is such that the cathode of tube 24 is negative with respect to its grid, current flows from the grid to the cathode and causes a voltage drop across resistances 122 and 124 of such polarity that the grid is negative with respect to ground. On the other hand, when the polarity of the winding 38 is reversed, the voltage across resistance 124 is no longer present, but the condenser 128 which was previously charged during the preceding half-cycle discharges through resistance 122 to cause the voltage across condenser 128 to discharge during this reverse half-cycle. Also, during this reverse half-cycle, the transformer winding 38 serves to apply a negative alternating current bias to the control grid of tube 24. Thus, the positive signal voltage which is developed on the anode of tube 22 must overcome these two bias voltages before the tube 24 will pass current. However, when the proper signal is developed on the anode of tube 22, the ungrounded terminal of the condenser 128 is rendered sufficiently positive to maintain the tube 24 in a conducting condition wherein the winding 28 is energized to cause the associated relay switch arm 28C to engage the stationary contact 28E. When this signal thus developed on the anode of tube 22 disappears, the tube 24 is not immediately restored to a non-conducting condition, but some time is required for the precharged condenser 128 to become sufficiently discharged. This time is, of course, dependent upon the time constant of the circuit which includes and which is associated with the condenser 128. The provision of a time delay of this type is advantageous because a short delay is needed to prevent the unit from responding to a no flame condition when for example momentary voids of flame appear. This time delay is between one to three seconds and may be adjusted by changing the magnitude of resistance 122 and 124.

It is preferred that the photoconductive cell 12 be of the cadmium sulfide type because of (1) its high sensitivity; (2) its spectral characteristics; (3) its small size; and (4) its allowed use in ambient temperatures which extend over a relatively wide range. A cadmium sulfide cell is particularly advantageous since the cell is insensitive substantially to red and infra-red light waves, the cell being primarily sensitive to blue and green portions of the spectrum, thus making it especially useful in detecting the presence of a gas flame.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. In a flame detecting system, a cell receiving radiation from a flame having intensity fluctuations, a source of continuous voltage, resistance means, a series circuit comprising said source, said cell and said resistance means developing a voltage across said cell which has a unidirectional voltage component representative of the average intensity of the flame as well as a voltage component varying in accordance with said fluctuations, an amplifying tube having a cathode, a control grid and an anode, impedance means, a conductive connection between one terminal of said cell and said control grid, a second conductive connection extending from the other terminal of said cell, through said impedance means to said cathode for selectively amplifying said varying voltage component while yet accommodating a relatively large range of values of said unidirectional voltage, a load resistance connected to said anode, said impedance means comprising a cathode resistance which is shunted by a condenser, said source being connected in a series circuit with said load resistance, said anode and cathode and said cathode resistance; said load resistance and cathode resistance being of such values that the potential of the cathode follows the potential of the grid for variations in such unidirectional voltage component but said tube serving to amplifying said voltage component that varies in accordance with said fluctuations, and control means coupled to said anode and controlled thereby.

2. In a flame detecting system, a photoconductive cell receiving radiation from a flame having intensity fluctuations, a source of continuous voltage, resistance means, a series circuit comprising said source, said cell and said resistance means for developing a voltage across said cell which has a unidirectional voltage component representative of the average intensity of the flame as well as a voltage component varying in accordance with said fluctuations, amplifying means including a tube having an anode, a cathode and a control grid, impedance means connected between said control grid and cathode, a conductive connection between one terminal of said cell and said control grid, a second conductive connection extending from the other terminal of said cell, through said impedance means to said cathode for maintaining the potential difference between said grid and cathode substantially constant with respect to said unidirectional component, but allowing the potential difference therebetween to vary in accordance with the magnitude of said varying voltage component, a load resistance connected to said anode, said impedance means comprising a cathode resistance which is shunted by a condenser, said source being connected in a series circuit with said load resistance, said anode and cathode and said cathode resistance; said load resistance and cathode resistance being of such values that the potential of the cathode follows the potential of the grid for variations in such unidirectional voltage component but said tube serving to amplify said voltage component that varies in accordance with said fluctuations, and control means coupled to said anode and controlled thereby.

3. In a system of the character described, an alternating current source of voltage comprising a first transformer winding and a second transformer winding, a radiation sensitive cell, rectifying means, impedance means, a series circuit comprising said first winding, said rectifying means, said impedance means and said cell for deriving a control voltage representative of the radiation impinging on said cell, means coupled to said series circuit for amplifying said voltage, a control tube having a cathode, an anode and a control grid, said first winding being connected between said anode and said cathode, said second winding being connected between said control grid and said cathode to render said control grid at a relatively negative potential with respect to said cathode when said first winding renders said anode positive with respect to said cathode, a series combination of resistances coupling said amplifying means to said control grid, a condenser having one terminal thereof connected to an intermediate point on said series combination of resistances and having the other terminal thereof connected to said cathode, and rectifying means coupled between said amplifying means and said cathode and serving to produce a rectified voltage across said condenser in accordance with the output of said amplifying means.

4. In a system of the character described, a cell for receiving radiation from a flame having intensity fluctuations, means coupled to said cell for deriving a voltage which has a unidirectional component representative of the average intensity of the flame as well as a component varying in accordance with said fluctuations, amplifying means coupled to the last-mentioned means, said amplifying means including an anode, a cathode, and a control grid, a network coupled between said anode and said grid comprising a regenerative path for a fluctuation frequency corresponding to said fluctuations and comprising a cancellation network for frequencies other than said fluctuation frequency, and means coupled to said anode and controlled in accordance with said varying component.

5. An arrangement as set forth in claim 4 including a degenerative network connected between said cathode and said control grid for preventing an excess regenerative effect.

6. A system as set forth in claim 2 in which said photoconductive cell is of the cadmium sulfide type which is relatively insensitive to radiation in the red and infra red regions of the flame spectrum but which is relatively sensitive to radiation in the blue and green portions of the flame spectrum.

7. In a flame detecting system, a cell for receiving radiation from a flame having intensity fluctuations, a source of continuous voltage, resistance means, a series circuit comprising said source, said cell and said resistance means for developing a voltage across said cell which has a unidirectional voltage component representative of the average intensity of the flame, as well as a voltage component varying in accordance with said fluctuations, first amplifying means including a tube having an anode, a cathode and a control grid, impedance means connected between said control grid and cathode, a conductive connection between one terminal of said cell and said control grid, a second conductive connection extending from the other terminal of said cell, through said impedance means to said cathode for maintaining the potential difference between said grid and cathode substantially constant with respect to said unidirectional component, but allowing the potential difference therebetween to vary in accordance with the magnitude of said varying voltage component, second amplifying means including a second control grid and a second anode, means coupling the first-mentioned anode to said second control grid, a network coupled between said second anode and said second control grid comprising a regenerative path for a fluctuation frequency corresponding to said fluctuations and comprising a cancellation network for frequencies other than said fluctuation frequency, and control means coupled to said second anode and controlled thereby.

References Cited in the file of this patent

UNITED STATES PATENTS

| | | |
|---|---|---|
| 2,084,186 | Braden | June 15, 1937 |
| 2,095,124 | Cockrell | Oct. 5, 1937 |
| 2,304,641 | Jones | Dec. 8, 1942 |
| 2,349,715 | Francis | May 23, 1944 |
| 2,667,102 | McDougall | Jan. 26, 1954 |
| 2,692,962 | Thomson | Oct. 26, 1954 |
| 2,697,824 | Norton | Dec. 21, 1954 |
| 2,748,846 | Smith et al. | June 5, 1956 |
| 2,749,447 | Smith | June 5, 1956 |
| 2,771,942 | Miller | Nov. 27, 1956 |
| 2,804,131 | Ator | Aug. 27, 1957 |